(12) United States Patent
Ruckle et al.

(10) Patent No.: US 7,850,190 B2
(45) Date of Patent: Dec. 14, 2010

(54) HITCH AND COUPLING ARRANGEMENT FOR AUTOMATICALLY EFFECTING TOWING HITCH AND FLUID QUICK-COUPLER CONNECTIONS BETWEEN A NURSE TANK WAGON AND AN $NH_3$ APPLICATOR IMPLEMENT

(75) Inventors: Jarrod Ruckle, Bondurant, IA (US); John Rumohr, Polk City, IA (US); Garrett Goins, Ankeny, IA (US); Spencer M. Nimberger, Houston, TX (US); Francisco Gonzalez, Houston, TX (US)

(73) Assignees: Deere & Company, Moline, IL (US); PGI International, Ltd., Houston, TX (US)

( * ) Notice: Subject to any disclaimer, the term of this patent is extended or adjusted under 35 U.S.C. 154(b) by 261 days.

(21) Appl. No.: 12/179,092

(22) Filed: Jul. 24, 2008

(65) Prior Publication Data

US 2010/0019471 A1 Jan. 28, 2010

(51) Int. Cl.
*A01B 59/043* (2006.01)
*B60D 1/36* (2006.01)
*B60D 1/62* (2006.01)

(52) U.S. Cl. .................. 280/421; 280/420; 280/477; 280/504; 137/15.09; 172/47

(58) Field of Classification Search .............. 280/416.1, 280/416.2, 416.3, 420, 421, 477, 504; 137/15.09, 137/625; 172/47
See application file for complete search history.

(56) References Cited

U.S. PATENT DOCUMENTS

| 2,844,390 | A | | 11/1956 | Smith | |
|---|---|---|---|---|---|
| 3,788,348 | A | | 1/1974 | Johnson | |
| 4,131,295 | A | | 12/1978 | Highberger | |
| 4,346,911 | A | | 8/1982 | Wiese | |
| 4,998,560 | A | | 3/1991 | Le Devehat | |
| 5,005,877 | A | * | 4/1991 | Hayman | 285/315 |
| 5,343,958 | A | * | 9/1994 | Kromminga et al. | 172/680 |
| 5,413,182 | A | * | 5/1995 | Kromminga et al. | 172/776 |
| 6,450,545 | B1 | * | 9/2002 | LeMay et al. | 285/93 |
| 6,938,636 | B1 | | 9/2005 | Nimberger | |
| 6,969,093 | B2 | * | 11/2005 | LeMay et al. | 285/86 |

\* cited by examiner

*Primary Examiner*—Tony H. Winner
*Assistant Examiner*—Marc A Scharich

(57) ABSTRACT

An $NH_3$ applicator implement is equipped with a hitch arrangement for automatically effecting a connection with a tongue of an $NH_3$ nurse tank wagon. A quick-connect coupler assembly is provided for connecting the transfer hose of the nurse tank wagon to the supply hose of the implement. The quick-connect coupler assembly includes a first coupler section mounted to the applicator implement for powered, guided movement into engagement with a second coupler section mounted to the tongue of the nurse tank wagon. An electro-hydraulic control system including relay logic is used to first lock the fully coupled coupler sections together and then to engage the flow of $NH_3$ by remote actuation of a main on/off valve located at the nurse tank.

22 Claims, 7 Drawing Sheets

HITCH AND COUPLING ARRANGEMENT FOR AUTOMATICALLY EFFECTING TOWING HITCH AND FLUID QUICK-COUPLER CONNECTIONS BETWEEN A NURSE TANK WAGON AND AN NH₃ APPLICATOR IMPLEMENT

FIELD OF THE INVENTION

The present invention relates to a hitch and coupling arrangement for automatically effecting hitch and quick-coupler connections between a nurse tank wagon carrying a tank of anhydrous ammonia ($NH_3$).

BACKGROUND OF THE INVENTION

Modern farming practices in North America require the application of fertilizer in order to maximize crop yields and, in turn, maximize profits. Currently, approximately 40% of this fertilizer is applied as anhydrous ammonia ($NH_3$) since it is the most cost effective per unit of nitrogen. However, despite this cost advantage, the use of NH3 has not changed significantly in the past few decades due to safety issues and the extra labor involved in a applying the $NH_3$. Historically, conventional knife injection applicators have been used to apply the $NH_3$ in the ground. These applicators generally tow a 1000-1500gallon $NH_3$ nurse tank. Multiple $NH_3$ wagons are used to support each applicator. When the tank borne by the wagon being towed by the applicator becomes empty, it is exchanged with a wagon bearing a full tank. A tender truck hooks up to the wagon bearing the empty tank in the field and transports it to a central fill station and then transports the wagon with the newly filled tank back to the field for the applicator to use. The current tank change operation is a multi-step process which requires the operator to physically dismount the tractor, put on $NH_3$ safety garb and/or, equipment and walk back to the just emptied tank to manually bleed and disconnect the tank. Typically, conventional applicators have to change tanks every 1 ½ hours and the process can take up to 15minutes with the operator, being exposed to a small amount of $NH_3$ vapor, hence the requirement for the safety garb and/or equipment. This manual tank change operation is inconvenient to the operator and reduces the overall productivity of the applicator.

It is a trend in farm equipment of various types to make units larger in order to more quickly cover the ground. However, an applicator which has the capability to apply $NH_3$ at nearly twice the speed of a conventional applicator would require the tanks to be exchanged nearly twice as often, or once every 45minutes. Employing the conventional manual change regimen, the down time involved in exchanging empty with full tanks would result in the large unit operating only at 75% efficiency.

The problems to be addressed then are those of reducing the amount of time required for exchanging empty with full tanks of $NH_3$ while reducing exposure of the operator to $NH_3$.

SUMMARY OF THE INVENTION

According to the present invention, there is provided a hitch and coupling arrangement for effecting automatic towing hitch and fluid quick-coupler connections between an anhydrous ammonia nurse tank wagon and an anhydrous ammonia applicator implement.

It is an object of the invention to reduce the time necessary for exchanging an empty anhydrous ammonia tank towed by an anhydrous ammonia applicator implement with a full tank while minimizing the exposure of an operator to anhydrous ammonia that might be vented or spilled during the exchange process.

The aforementioned object is achieved by providing a remotely operable arrangement effecting decoupling of a fluid quick-coupler and implement hitch so as to disconnect the implement from an empty tank of $NH_3$ and for subsequently effecting coupling of the quick-coupler and implement hitch so as to connect the implement to a full tank of $NH_3$. More specifically, there is provided a first coupler section of the quick-coupler that defines a receptacle for receiving an insert defined by a second coupler section of the quick-coupler, the first coupler section being mounted to a carriage mounted at the rear of the applicator implement for powered fore-and-aft movement toward and away from the second coupler section which is supported on the tongue of the $NH_3$ tank wagon. The quick-coupler sections include cooperating guide elements for guiding them together during coupling and are provided with cooperating, remotely operable, detent elements for selectively locking the coupled first and second coupler sections together or for releasing the detent elements for permitting the coupled sections to be separated from each other. The coupled sections can also be forcibly decoupled to prevent hose breakage and $NH_3$, loss if for any reason, such as a broken hitch connection, for example, an excessive pull is exerted between the supply and transfer hoses.

This and other objects of the invention will become apparent from a reading of the ensuing description together with the appended drawings.

DESCRIPTION OF THE PREFERRED EMBODIMENT

Figure 1:
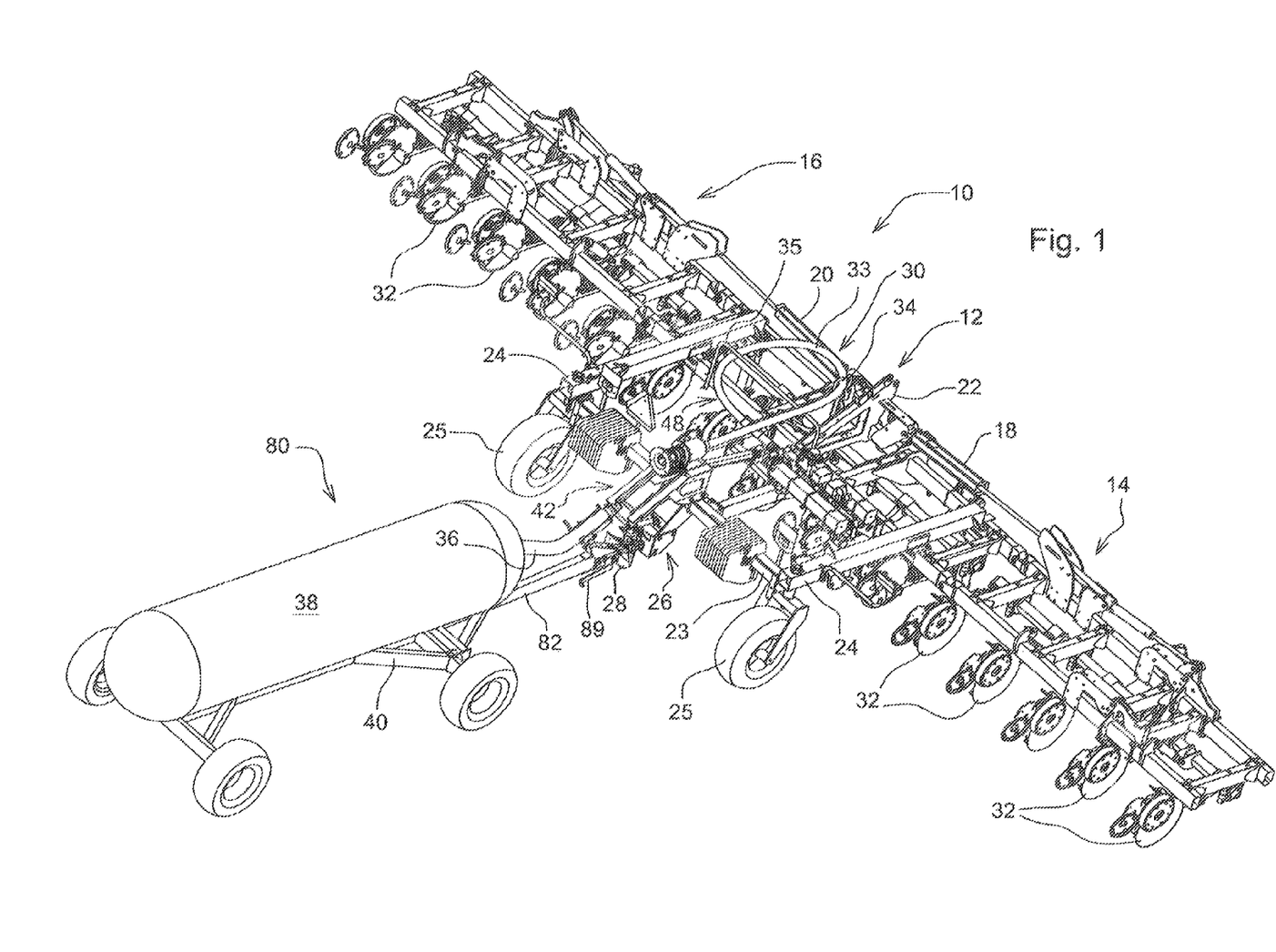
FIG. 1 is a right rear perspective view showing an anhydrous ammonia applicator implement coupled for towing an anhydrous ammonia nurse tank wagon, and showing first and second coupler sections of a quick-coupler assembly prior to being automatically coupled together.

Referring now to FIG. 1, there is shown an anhydrous ammonia applicator implement 10 coupled for towing an anhydrous ammonia nurse tank wagon 80. The applicator implement 10 is here shown as a winged implement including a center section 12, having right- and left-hand wing sections 14 and 16, respectively, hinged to its opposite sides for swinging vertically between lowered working positions, as shown, and raised transport positions, with right- and left-hand hydraulic lift cylinders 18 and 20 being provided for selectively moving the wing sections between their working and transport positions.

The center section 12 is equipped at its front with attachment points for a tractor three-point hitch, with only the upper attachment point 22 being visible. A transverse support beam 23 is fixed between a rear region of a pair of transversely spaced, longitudinally extending beams 24 of the center section 12 and a pair of ground wheels 25 are respectively caster-mounted to rear ends of the beam 24 Supported from a central region of the beam 23 is a towing hitch structure 26 which extends down and to the rear from the beam 23 and includes a generally funnel-shaped rearwardly opening tongue receptacle 28.

Figure 2:
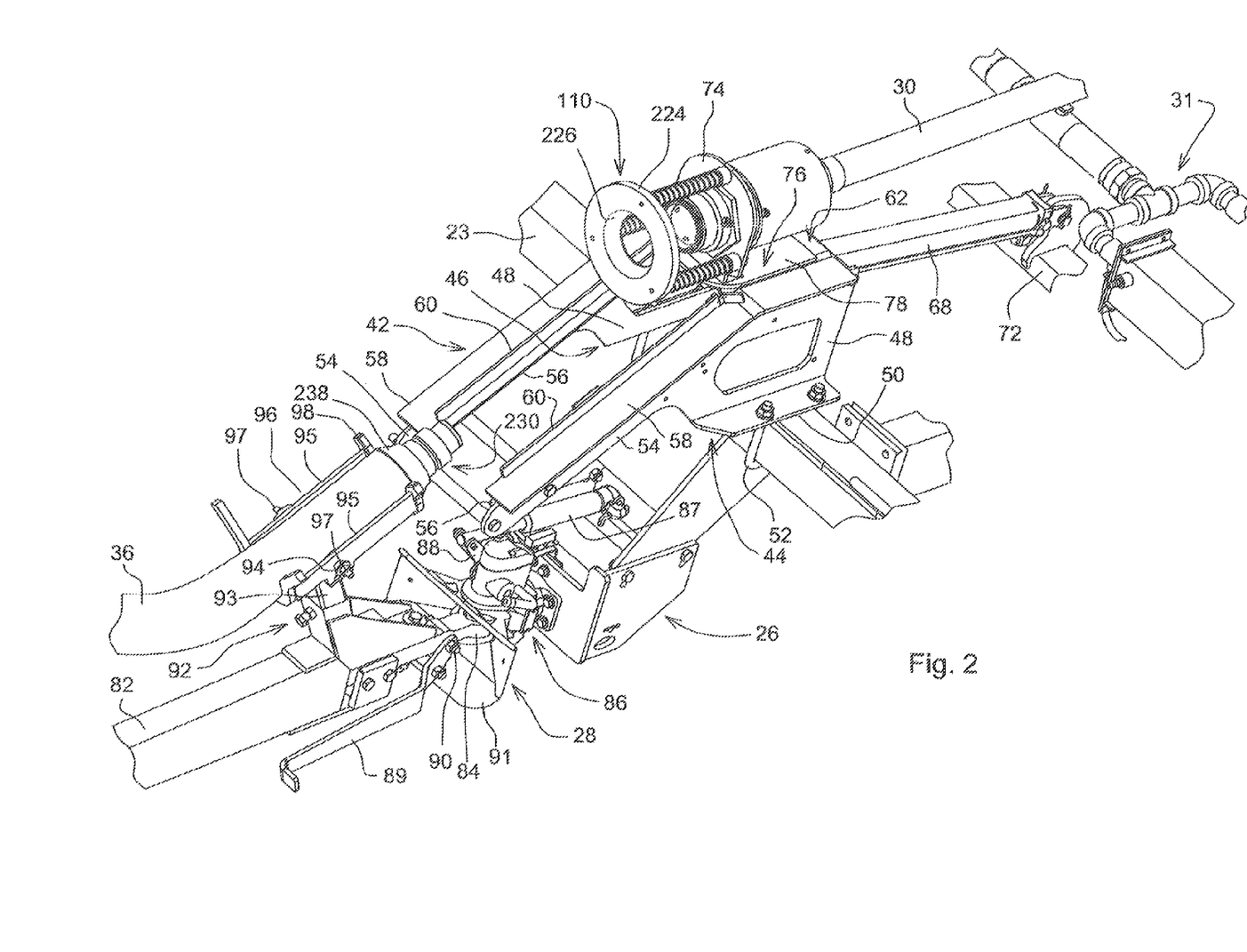
FIG. 2 is an enlarged view of that portion of FIG. 1 which shows the mechanism for automatically effecting coupling of the first and second quick-coupler sections.

Referring now also to FIG. 2, it can be seen that a flexible $NH_3$ supply hose 30 has one end coupled to a manifold arrangement 31 which is coupled to a plurality of individual feed lines (not shown) which respectively distribute the $NH_3$ to each of a plurality of soil opener arrangements 32 provided in transversely spaced relationship to each other across the width of the implement 10. For a reason explained below, the supply hose 30 includes a relatively long length which is formed into a loop 33 that goes through an eye of a hose guide 34 located at a front, center region of the center section 12. The supply hose 30 extends to the rear from the guide 34 and over a transversely extending, inverted U-shaped hose support 35 having legs fixed to a tool bar of the center section 12, with the hose 30 extending first leftward at the front of guide 34 and then rearward beneath the hose support 35.

A fluid quick-coupler assembly 100 (FIGS. 4-7) is provided for interconnecting the fluid supply hose 30 to a flexible fluid transfer hose 36 leading from a nurse tank 38 carried by a wheeled wagon frame 40 of the nurse tank wagon 80. The fluid quick-coupler assembly 100 includes a first fluid coupler section 110 connected to a rear end of the fluid supply hose 30, and a second fluid coupler section 230 connected to a front end of the fluid transfer hose 36.

Figure 3:
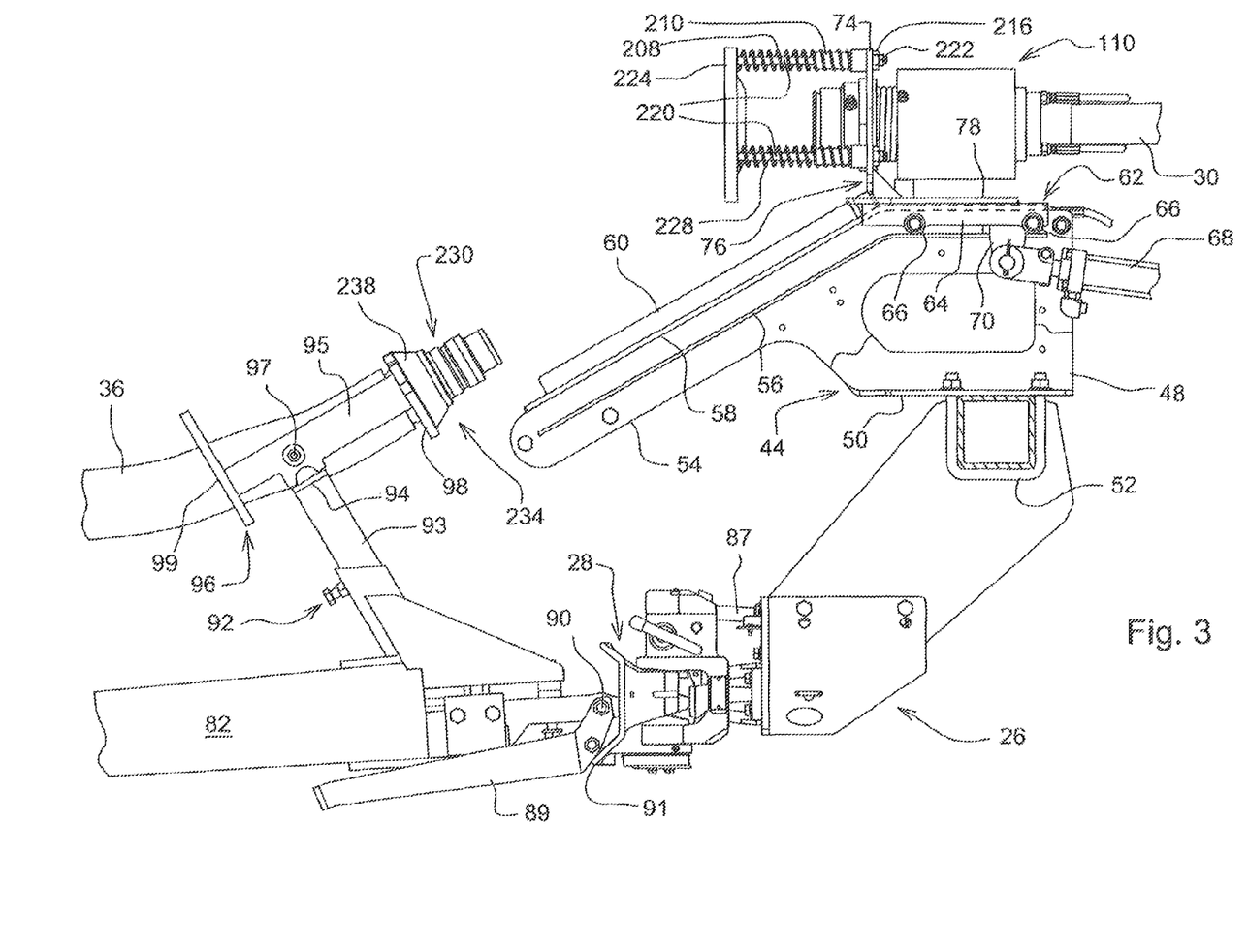
FIG. 3 is a side view of the mechanism for automatically effecting coupling of the first and second quick-coupler sections, with part of the guide track assembly broken away to reveal the cylinder connection with the carriage carrying the first coupler section.

As can best be seen in FIG. 3, guide track assembly 42 is mounted to a central location of the support beam 23 so as to be centered above the hitch assembly 26. The guide track assembly 42 comprises right- and left-hand parallel, vertical plates 44 and 46, respectively, which are each provided with a forward end region 48, which is generally rectangular and has a lower out-turned flange 50 which overlies the support beam 23 and is secured thereto by a U-bolt 52. Each plate 44 and 46 further includes a rear region 54 having only about one-third of the height of the front region 48 and being joined to and inclined downwardly and to the rear from an upper rear part of the front region 48. Fixed to each of confronting faces of the plates 44 and 46 is an edge of a guide track 56 including a horizontal section spaced a short distance below an upper edge of forward end region 48 and a downwardly and rearwardly inclined section .space a short distance below an upper edge of the inclined rear region 54. A transverse plate 58 is fixed to the top edge of the plates 44 and 46, and, fixed to an inside region of the inclined portion of each transverse plate 58 is a vertical guide strap 60. The respective guide tracks 56 are spaced from each other so as to define a gap between them. A carriage 62 comprising a channel-shaped body 64 disposed with depending flanges at its opposite sides, with front and rear sets of rollers 66 being mounted to the flanges is mounted for rolling fore-and-aft along the guide tracks 56. Movement of the carriage 62 along the guide tracks 56 is selectively achieved by operation of an extensible and retractable hydraulic actuator 68 having its rod end coupled to a connecting ear 70 provided at a front underside location of the carriage 62 so as to extend downwardly through the gap provided between the guide tracks 56. The cylinder end of the actuator 68 is coupled to a frame member 72 of the center section 12 of the applicator implement 10. When the actuator 28 is retracted, the carriage 62 is positioned on the horizontal section of the guide tracks 56, 56 where it holds the first coupler section 110 for transport, as shown in Figs. 2 and 3, or holds the coupled coupler sections 110 and 230 for field operation.

The first fluid coupler section 110 is connected, in a manner described below, to a vertical mounting plate 74 of an L-shaped mounting structure 76 having a horizontal mounting plate 78 joined to the bottom of vertical plate 74 and overlying and being fixed to the carriage 62. Thus, extension of the actuator 68 from its retracted position shown in FIGS. 2 and 3 will result in the carriage 62 rolling forwardly along the guide tracks 56, 56 so as to carry the first coupler section 110 down the inclined section of the guide tracks 56, 56 for being aligned with, and coupled to, the second coupler section 230, in a manner described below.

The nurse tank wagon 80 includes a tongue 82 coupled at the forward end of the wagon frame 40, the tongue 82 including a forward end defined by a circular coupling ring 84 located within the tongue receptacle 28 and receiving a retractable hitch pin (not shown) located within a clevis structure 86. A single-acting hydraulic actuator 87 is coupled to a linkage, partially shown at 88, which is attached to the hitch pin, with retraction of the actuator effecting the withdrawal of the hitch pin from the coupling ring 84, with a compression spring (not shown) being located within the actuator cylinder and acting against the piston to extend the rod so as to normally retain the pin in its hitching position within the coupling ring 84. A support stand 89 is pivotally coupled to the tongue 82 by a pivot pin 90 located adjacent a bottom lip 91 of the tongue receptacle 28, the lip 91 acting to fold the stand 89 from an upright, support position, wherein a foot of the stand is in ground engagement, to an elevated stored position, as shown, wherein the stand 89 extends backward along an underside of the tongue 82 from the pivot pin 90. Fixed to, and extending above, the tongue 82 is a hose support structure 92 including a base defining an upright receptacle receiving a post 93 having a connecting bracket 94 at its top to which opposite side straps 95 of a hose cradle 96 are is pivotally connected as at pivot connections 97, which define a transverse horizontal pivot axis. Defining a front end of the cradle 96 is a front, generally U-shaped rod 98 having upwardly diverging legs fixed to forward ends of the straps 95. Similarly, a rear end of the cradle 96 is defined by a rear, generally U-shaped rod 99 having diverging legs fixed to rearward ends of the side straps 95. The cradle 96 is sloped upwardly towards the front so as to have an inclination approximately the same as that of the inclined section of the guide tracks 56. The supply hose 36 in the hose cradle 96, with the fluid coupler section 230 being located just in front of the U-shaped rod 98 at the forward end of the cradle so as to be substantially axially aligned with the coupler section 110 when the latter, together with the carriage 62, is positioned on the sloped part of the guide track 56, 56 by extension of the actuator 68. In a manner described in more detail below, the hydraulic actuator 68 may be operated remotely during the process for effecting the coupling and decoupling of the quick-coupler assembly 100 by respectively bringing the coupler section 110 into engagement with the coupler section 230, or by separating the coupler section 110 from the coupler section 230.

Figure 4:
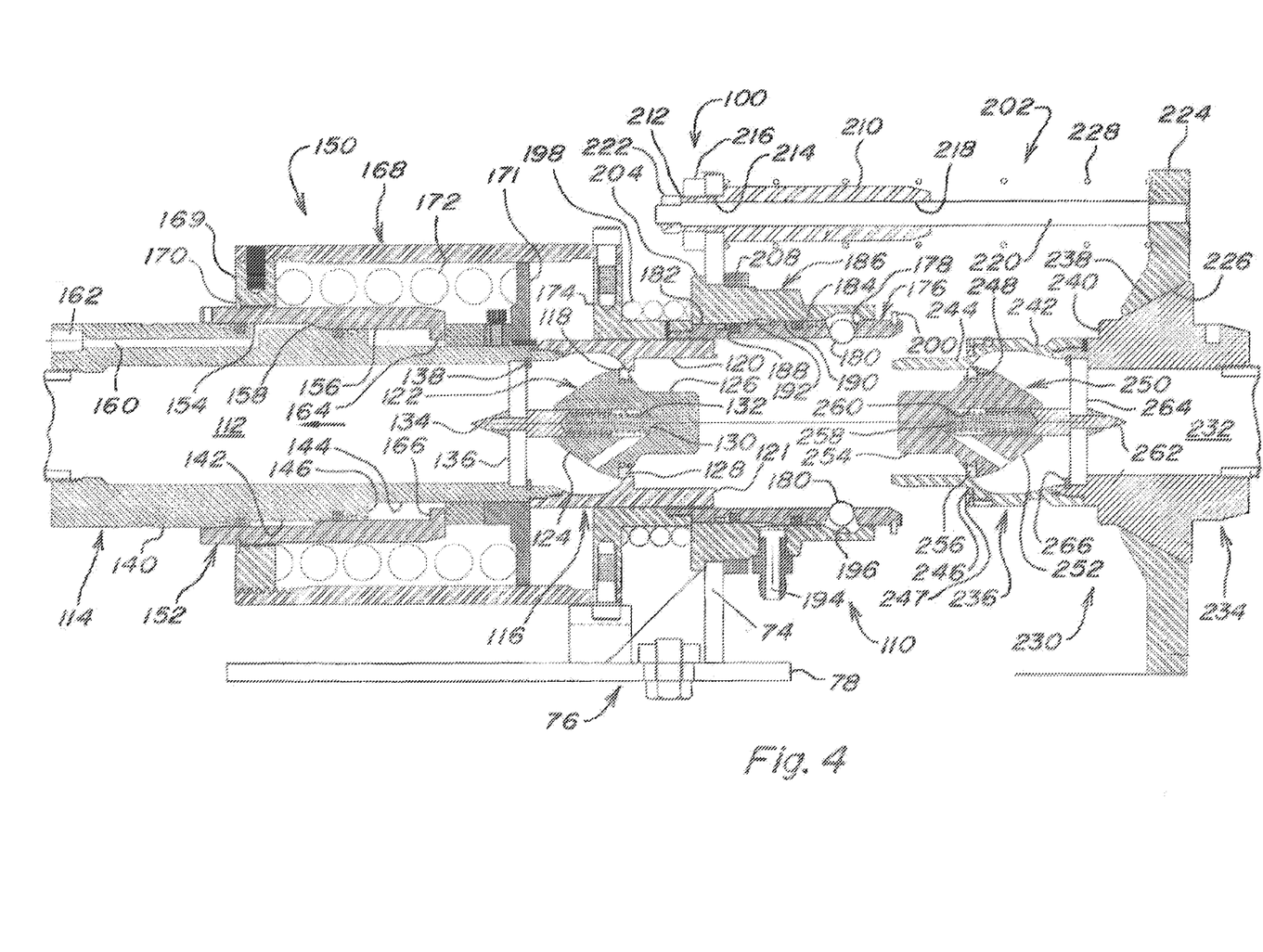
FIG. 4 is a vertical sectional view taken lengthwise through the quick-coupler with the first and second coupler sections being shown in a separated condition occurring at initial contact of the first coupler section with the second coupler section during coupling the quick-coupling sections together.

Referring now to FIG. 4, the quick-coupler 100 is shown in an uncoupled condition with the first and second coupler sections 110 and 230 being in axial alignment with, but with fluid conveying parts being separated from, each other. Specifically, the first coupler section 110 includes a central fluid passage 112. Starting from the left in FIG. 4, the first coupler section 110 comprises a control collar arrangement support 114 and a valve housing 116, which are configured substantially as cylindrical tubes and have ends screwed together to form a single unit. The interior of the valve housing 116 is provided with an annular inward projection defining a leftwardly facing valve seat 118 and a rightward facing bottom of a cylindrical receptacle 120 having an annular seal lip 121 at its right end, the receptacle being adapted for receiving an end portion of the second coupler section 230, as described in further detail below. Located centrally within the valve housing 116 is a poppet valve head 122 including a bulbous left end section 124 joined to a rightwardly projecting stem section 126 and carrying an annular seal 128 held in sealed engagement with the seat 118 by a coil compression spring 130 acting between a bottom end of a blind bore 132 extending axially in the left end section 124 of the valve head 122 and a valve head guide 134 received in the bore and anchored to a guide support 136 retained within a right end region of the lock arrangement support 114 by a snap ring 138.

Figure 5:
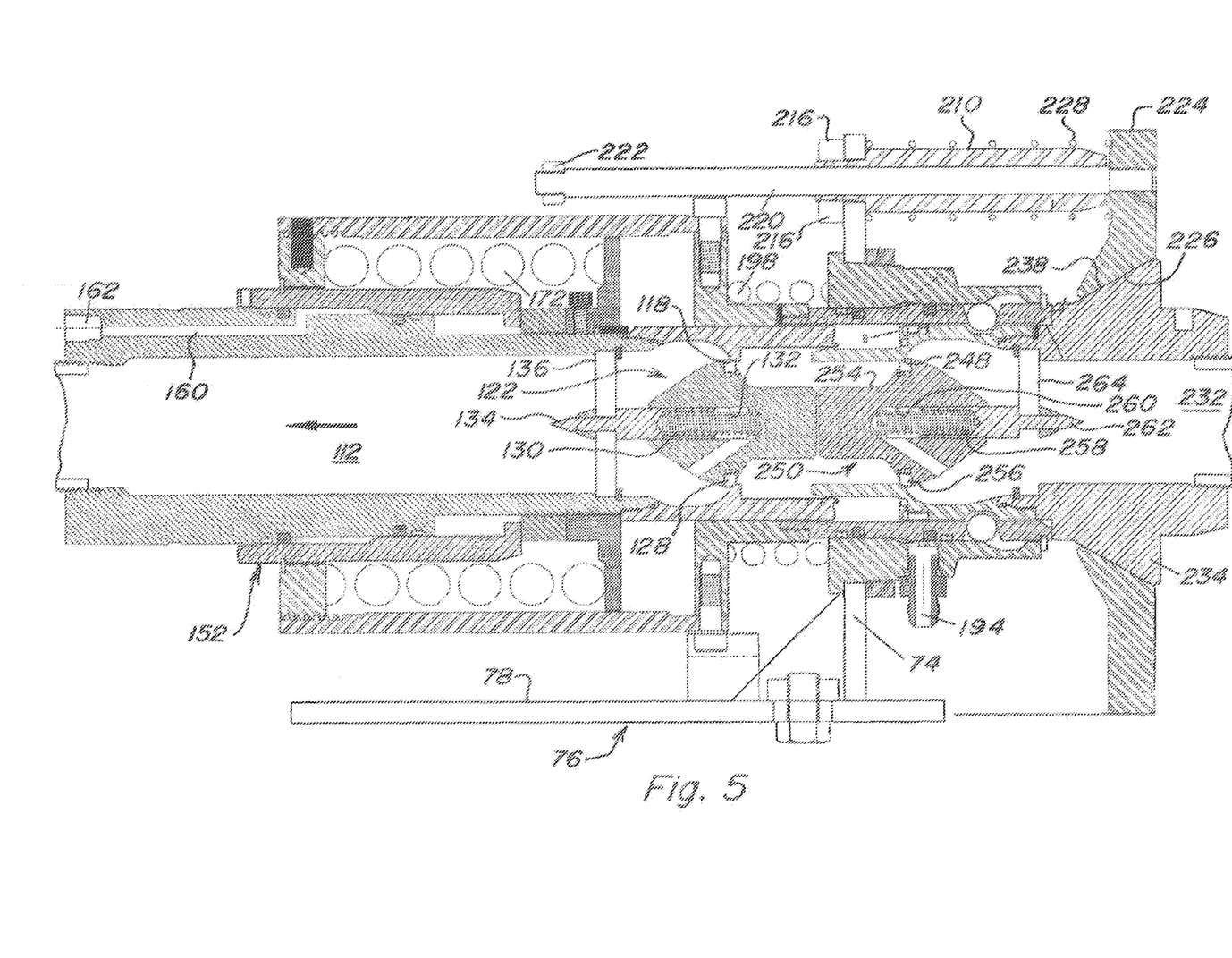
FIG. 5 is a sectional view like FIG. 4, but showing the quick-coupler sections in a receiving locked position wherein the quick coupler sections are locked together, with the poppet valves being shown in a closed condition preventing flow through the quick-coupler.
Figure 6:
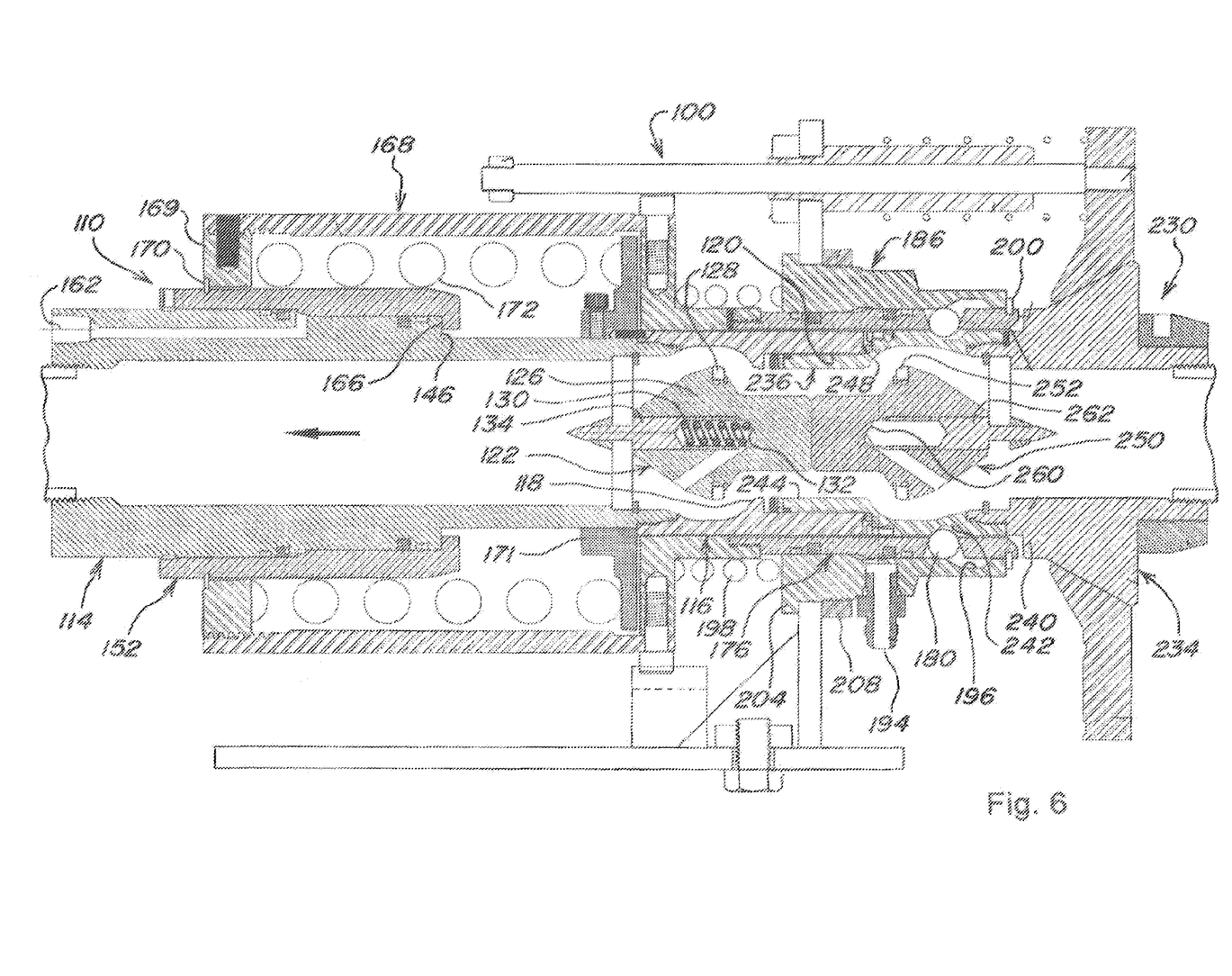
FIG. 6 is a view like FIG. 5, but showing the quick-coupler sections in an operating position, with the poppet valves open permitting flow through the quick-coupler
Figure 7:
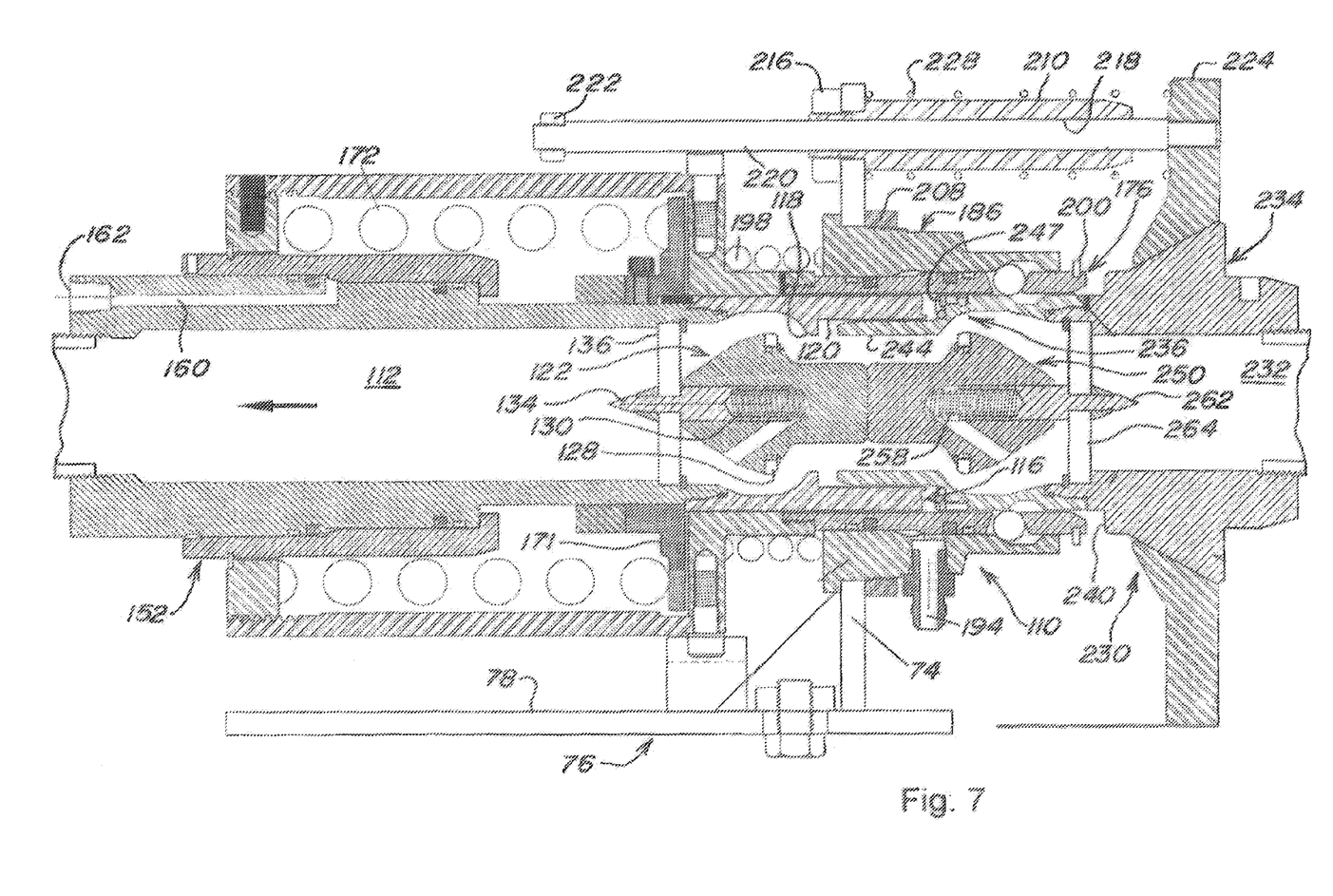
FIG. 7 is a view showing the quick-coupler sections in an operating position like FIG. 6, but showing the quick-coupler sections in a breakaway condition wherein the detent balls are located at a release point.

The exterior of the control collar arrangement support 114 includes a left end region 140 having a first diameter, a middle region 142 having a second diameter slightly smaller than that of the left end region, and a right end region 144 having a third diameter substantially less than that of the middle region thereby defining an annular stop surface 146 facing rightward. A control collar locking arrangement 150 is mounted for shifting axially along the support 114 and valve housing 116 and includes a lock control collar 152 received on the support 114 and having an interior surface including a left end region 154 and a middle region 156 respectively sized for sliding along the left end and middle regions 140 and 142 of the support 114. Since the inside surface of the left end surface region 154 is stepped outwardly from the inside diameter of the middle surface region 56, an axially facing surface 158 is defined at the juncture of the different inside diameters. A fluid passage 160 extends between a port 162 located in an end surface of the support 114 and an exit point located at the juncture of the different outside diameter surfaces of the left and middle regions 140 and 142 of the support 114. Leakage of fluid along the respective interfaces between the left and middle region of the support 114 and the left and middle regions 154 and 156 of the collar 152 is prevented by appropriate seals (not numbered) received in annular grooves provided in the left and middle regions of the support 114. Thus, when a source of pressurized fluid is coupled to the port 162, the pressure will act against the surface 158 and cause the dollar 152 to shift to the right, as shown in FIGS. 4 and 5, for example. The collar 152 further includes a relatively short right end region 164 having an inside diameter that is less than that of the middle region 156, thereby defining an annular, leftward facing stop surface 166 located in confronting relationship to the stop surface 146 provided on the locking arrangement support 114, with the stop surfaces 146 and 166 becoming engaged with each other, as shown. FIG. 6, by the action of the spring 172 in the absence of fluid pressure at the port 162.

The control collar arrangement 150 further includes a hollow, cylindrical spring housing 168 having a left end wall defined by a circular ring 169 having an inside diameter engaged with a cylindrical outer surface of the collar 152, with a snap ring 170 being mounted in a groove provided in the collar 152 adjacent its left end for the purpose of engaging the ring 169 and causing the housing 168 to be shifted rightward when the collar is shifted rightward. A spring abutment ring 171 is received on, and secured to, the support 114 at a location adjacent the valve housing 116. A coil compression spring 172 is located in the housing 168, with opposite ends of the spring 172 being in engagement with the end wall ring 169 and the abutment ring 171. The housing 168 extends axially to the right from the snap ring 170 and has a right end wall defined by a support hub 174 received on the valve housing 116 and having a threaded right end screwed onto a threaded left end of a tubular detent ball carrier 176 that projects to the right beyond a right end of the valve housing 116. A plurality of angularly spaced funnel-shaped, detent ball receptacles 178 are arranged in a vertical plane traversing the ball carrier 176 at a location adjacent its right end, and each receptacle 178 contains a detent ball 180. An exterior surface of the ball carrier 176 includes a left end region 182 having a diameter slightly less than that of a right end region 184, the later containing the ball receptacles 178. A detent ball lock/release collar 186 includes respective interior surface regions 188 and 190, sized for respectively sliding along the exterior surface regions 182 and 184, with it being noted that due to the fact that the surface region 188 is at a lesser diameter than the surface region 190, an annular, rightwardly facing surface 192 is defined at the juncture of the two regions. A port 194 is provided in the collar 186 in communication with the surface 192. Leakage of fluid along the respective interfaces between the left and right end regions 182 and 184 of the ball carrier 176 and the left and right end regions 188 and 190 of the lock/release collar 186 is prevented by appropriate seals (not numbered) received in annular grooves provided in the left and right regions of the ball carrier 176. An annular ball-release groove 196 is provided in the interior surface region 190 of the collar 186 at a location adjacent its right end. When a source of pressurized fluid is coupled to the port 194, the collar 186 is shifted to a leftward, ball release position, as shown in FIG. 4. wherein the ball-release groove 196 is positioned in register with the detent balls 180 so as to permit them to move freely radially outward. When the detent ball lock/release collar 186 is in its release position, shown in FIG. 4, a coil compression spring 198, which encircles the hub 174, is compressed between the collar 186 and the hub 174. Upon pressurized fluid being released through the port 194, the spring will act to shift the collar 186 to the right to a locking position wherein the right end of the collar 186 is shifted into engagement with a snap ring 200 provided in a groove located adjacent the right end of the ball carrier 176, the ball-release groove 196 then being in a locking position, as shown in FIG. 5, wherein it is misaligned to the right of the detent balls 180.

A valve coupler section alignment arrangement 202 is supported at the left end region of the detent ball lock/release collar 186. Specifically, the left end of the collar 186 is defined by a flange 204 and the alignment arrangement 202 includes the vertical support plate 74 of the mounting structure 76, the plate 74 being received on the collar and clamped against the flange 204 by a threaded ring 208 engaged with a threaded section of the exterior of the collar. Three identical, axially extending, cylindrical rod guides 210 (only one shown in FIGS. 4 - 7) are equally spaced from each other angularly about the collar 186 and have reduced diameter end sections 212 inserted, from the right, through holes 214 provided in the support plate 74. The reduced diameter end sections 212 of each rod guide 210 is threaded and receives a retaining nut 216 which secures the rod guide to the plate. Extending axially through each rod guide 210 is a bore 218 in which a rod 220 is received for sliding, with a nut 222 being threaded onto the left end of the rod for preventing it from being withdrawn rightward from the rod guide 210. Each of the rods 220 has a threaded right end engaged with a threaded bore provided in a centering plate 224 that is disposed parallel to the support plate 74. The centering plate 224 has a thickened center region that is provided with a frusto-conical opening 226 oriented with its large diameter to the right. Received on each of the rods 220 and having a left end portion encircling each of the rod guides 210 is a coil compression spring 228 having its opposite ends engaged with the plates 74 and 224, the arrangement of the rods 220 and springs 228 permitting the guide plate 224 to be resiliently shifted axially relative to the plate 74 during the operation of aligning the first and second sections 110 and 230 of the quick-coupler arrangement 100 with each other, in a manner described below in further detail.

The second quick-coupler section 230 includes a central fluid passage 232 and is comprised of a centering guide 234 and a valve housing 236 having threaded ends screwed together to form a single unit. Located at a central region between opposite ends of the centering guide 234 is a frusto-conical guide surface 238, which has a small diameter end joined to a step which defines an axially facing, annular abutment surface 240. The exterior of the valve housing 236 is provided with an annular detent groove 242 spaced a predetermined distance from the abutment surface 240. The guide surface 238 is shaped complementary to the opening 226 provided in the guide plate 224 carried by the first quick-coupler section 110.

The valve housing 236 is formed substantially as a cylindrical tube having an exterior wall which is stepped between its opposite ends so as to define a cylindrical insert section 244 sized to fit closely within the receptacle 120 of the first quick-coupler section 110, the insert section 244 terminating at an axially facing, annular seal 246 with an o-ring secured in position by an attachable o-ring keeper 247. The seal 246 is disposed for contacting an end surface of the receptacle 120, with the keeper 247 acting as a stop for being engaged by a right end surface of the receptacle 120 when the quick-coupler is in the operating condition illustrated in FIG. 6

An annular valve seat 248 is formed on an interior surface of the valve housing 236 at a location where the insert section 244 joins the remainder of the valve housing 236.

Located centrally within the valve housing 236 is a poppet valve head 250 including a bulbous right end section 252 joined to a leftwardly projecting stem section 254 and carrying an annular seal 256 held in sealed engagement with the seat 248 by a coil compression spring 258 acting between a bottom end of a blind bore 260 extending axially in the right end section 252 of the valve head 250 and a valve head guide 262 received in the bore and anchored to a guide support 264 retained within a left end region of the centering guide 234 by a snap ring 266.

In operation, assume that an operator of a tractor hitched to the applicator implement 10 is notified by a signal sent by a tank pressure sensor, for example, of the fact that the nurse tank wagon 80 being towed by a semi-mounted applicator implement 10 has just become depleted of $NH_3$. Also assume that a tender truck operator has left a filled exchange nurse tank wagon 80 in a generally level exchange site in the field and has opened the main on-off $NH_3$ valve on the wagon to prepare for connecting the tank to the applicator implement 10. The operator will then drive the tractor to the exchange site and, without leaving the seat of the tractor, will actuate the hydraulic actuator 68 causing it to extend to move the carriage 62, together with the attached quick-coupler assembly 100, rearwardly from the operating/transport position on the horizontal section of the guide track 56, 56 to the inclined section of the guide track, with hydraulic fluid pressure at the same time being routed to the port 162 of the valve section 110 causing the control collar 152 to be shifted to the right carrying with it the spring housing. 168 and the detent ball carrier 176, with the latter engaging the centering guide 234 and causing it to move rightwardly so as to permit the poppet valve heads 122 and 150 to move to their closed positions, as shown in FIG. 5. Fluid pressure is then coupled to the port 194 so as to cause the detent ball lock/release collar 186 to be shifted to the left against the bias of the springs 198 to a release position wherein the ball release groove 199 is in register with the balls 180. Gravity will then cause the coupler section 230 and its attached hose 36 to fall away from the coupler section 110 and into the hose cradle 96 with a rearwardly directed surface of the centering guide 234 of the coupler section 230 abutting the U-shaped rod 98 which defines the front of the cradle 96. At this time, the hitch pin actuator 87 is actuated to withdraw the hitch pin from the drawbar coupling ring 84, after which the operator will pull forward, and the support stand 89 of the nurse wagon hauling the depleted tank 38 will drop to support the ring 84 in position for automatic coupling to the tender truck hitch. The operator will then drive away from the depleted tank while actuating the hydraulic cylinder 68 causing it to retract and move the carriage 62 up the inclined section to the horizontal section of the guide track 56, 56. At the same time, pressure fluid will be exhausted from the ports 162 and 194. The tender truck driver closes the main on-off $NH_3$ valve on the depleted wagon upon pick up for refilling.

Next, the operator will back the tractor together with the applicator implement 10 so as to receive the coupling ring 84 at the front of the tongue 82 of the replacement nurse tank wagon 80. The lip 91 raises the stand 89 into the-storage position. At this point the coupling ring 84 will be properly located in the clevis structure 86 for having the hitch pin installed and this will be done by operating a control valve for relieving the pressure from the actuator 87, with its internal spring acting to insert the hitch pin through the coupling ring to secure the ring to the clevis structure 86. The operator then drives the tractor back towards the field location where application of $NH_3$ stopped. At the same time, the hydraulic control valve for the actuator 68 is actuated to effect extension of the actuator 68 so as to cause the coupler section 110 to be carried rearward by the carriage 62. At the same time, the coupler section 110 will be readied for coupling, as shown in FIG. 4, by pressurized fluid being routed to the ports 162 and 194. As the carriage 62 travels down the inclined portion of the guide track 56, 56, the centering plate 224 will eventually come into contact with the guide surface 238 of the centering guide 234. Any slight misalignment of the coupler sections 110 and 230 will be accommodated by the centering plate 224 being deflected by the interaction of the centering guide surface 238 and the frusto-conical opening 226 of the centering plate 224, with the coupler section 230 tilting, if necessary, about the axis defined by the connection pins 97. Upon the guide surfaces 226 and 238 becoming engaged with each other, as shown in FIG. 4, the coupler sections 110 and 230 will be properly aligned for being connected together.

With reference to FIG. 4, continued extension of the actuator 68 will cause the mounting plate structure 76 to travel towards the coupler section 230 with the result that the mounting plate 74, together with the rod guides 210, are slid to the right along the rods 220 against the action of the springs 228, while the detent ball carrier 176 moves along the exterior of the valve housing 236 until the end of the carrier 176 engages the abutment surface 240 of the centering guide 234, at which time the detent balls 180 come into alignment with, and drop into, the detent ball groove 242.

At this point, fluid pressure is exhausted from the port 194, thus permitting the loaded springs 198 to shift the lock/release collar 186 to its rightward locking position, shown in FIG. 5, wherein it retains the detent balls 180 in the ball groove 242. At this point, fluid pressure is exhausted from port 162, whereupon the spring 172 acts to cause relative axial movement between the receptacle section 120 of the valve housing 116 and the insert section 244 of the valve housing 236 resulting in the right end of the housing 116 coming into engagement with the seal keeper 247 and seal 246.

During this movement, which begins with the receptacle section 120 and insert section 244, as illustrated in FIG. 5, and ends with the receptacle section 120 and insert section 244 positioned, as illustrated in FIG. 6, the stems 126 and 254, respectively of the poppet valve heads 122 and 250 become engaged with each other and cause the valve heads 122 and 250 to be moved from their closed positions shown in FIG. 5 to their open positions shown in FIG. 6. It is to be noted that once the coupler sections 110 and 230 are locked together, as shown in FIG. 5, the valve controlling the hydraulic actuator 68 is actuated to cause the actuator 68 to retract so as to place the carriage 62, together with the coupler 100, at the horizontal section of the guide track 56, 56.

In the event that an excessive pulling force is exerted between the coupler sections 110 and 230 when they are locked together, as shown in FIG. 6, for example, the coupler arrangement 100 is designed to separate with the valve heads 122 and 250 immediately shifting to closed positions to prevent leakage of anhydrous ammonia from the hoses 30 and 36, such separation also preventing hose breakage. Specifically, with reference to FIG. 7, there the coupler arrangement 100 is shown in a breakaway condition where the detent balls 180 have just been forced out of the detent ball groove 242 by a force which has overcome the retaining force exerted by the springs 198, with it being noted that the compressed springs 228 between the support plate 74 and centering plate 224 subtract from the retaining force exerted by the springs 198. Further separation of the first and second coupler sections 110 and 230 from each other will result in the valve heads 122 and 250 moving into respective closed positions for preventing ammonia leakage.

It will be appreciated then that an operator can easily and quickly exchange an empty nurse tank wagon 80 for a full nurse tank wagon, while minimizing the exposure of the operator to any anhydrous ammonia liquid or gas during the exchange process. Further it will be appreciated that the coupling structure described above provides for automatic decoupling and to prevent hose breakage and NH$_3$ loss if for any reason, such as a broken hitch connection, an excessive pull is exerted between the transfer and supply hoses. As can be appreciated from the description, no hydraulic pressure is required at the coupler arrangement 100 to maintain the latter in its locked conditions, nor is hydraulic pressure required to maintain the hitch pin in its installed position so that hydraulic system pressure loss does not result in implement hitch or fluid coupler disconnection. Because the hitch coupling structure is activated before the hose coupling structure, relative hose positions are well defined and repeatable for a uniform, predictable coupling procedure. The coupling structure provides a unique integrated hydraulic control of the coupler flow and hose attachment. The actual final fluid connection between the hoses can be completed while the operator drives from the exchange site to the field position to thereby decrease the amount of time necessary to make the exchange. Because the volume between the coupler portions on the hoses is relatively small, only a few milliliters (about nine cubic inches) of NH$_3$ will be exhausted to atmosphere during coupling and uncoupling. However, a shield may be placed adjacent the couplers to prevent the exhaust from traveling in a particular direction.

Having described the preferred embodiment, it will become apparent that various modifications can be made without departing from the scope of the invention as defined in the accompanying claims.

The invention claimed is:

1. A hitch and coupling arrangement for automatically hitching an anhydrous ammonia nurse tank wagon for being towed by an applicator implement and for interconnecting a first coupler section located at one end of a nurse tank transfer hose and a mating second coupler section located at one end of an applicator implement supply hose so as to form a fluid coupler assembly permitting the flow of ammonia from the nurse tank to the applicator hose, the improvement comprising: said applicator implement including:
   a rearwardly opening tongue receptacle fixed at a given height above the ground for receiving a forward end of a tongue of said nurse tank wagon;
   a fore-and-aft extending guide track mounted above said tongue receptacle;
   a carriage being mounted for movement along said guide track;
   said first coupler section being mounted for movement with said carriage, with said supply hose being flexible and of a length sufficient for permitting said carriage to move feely along said guide track so as to move said first coupler section along a coupling path; and
   a reversible power device being coupled to said carriage for selectively moving the carriage along said guide track; and
said nurse tank wagon including:
   a tongue having a forward end defined by a tongue coupler, and having a support stand mounted for selective movement between a retracted stored position, wherein it extends along a remaining portion of said tongue and an extended position, wherein it supports said tongue coupler at least approximately at said given height above the ground;
   said first and second coupler sections being constructed for becoming locked together to form said fluid coupler assembly when said first and second coupler sections are forced together; and
   a hose support being coupled between said tongue and said hose at a region adjacent said second coupler section and supporting said second coupler section in substantial alignment with said coupling path, whereby, once said tongue coupler is received in said receptacle, said power device may be operated to bring said first coupler section into locked engagement with said second coupler section.

2. The hitch and coupling arrangement, as defined in claim 1, wherein said guide track is centered above said tongue receptacle.

3. The hitch and coupling arrangement, as defined in claim 1, wherein said guide track includes a horizontal rear section joined to a downwardly and forwardly inclined front section.

4. The hitch and coupling arrangement, as defined in claim 1, wherein said power device is an extensible and retractable hydraulic actuator having one end coupled to said carriage, and an opposite end coupled to, a frame member of said implement.

5. The hitch and coupling arrangement; as defined in claim 4 wherein said guide track includes first and second plates disposed in transversely spaced, parallel relationship to each other; first and second horizontal track members being respectively fixed to, and projecting toward each other from, said first and second plates, with a gap being left between said track members; said carriage having rollers engaged with said track members and a connecting leg depending through said gap and coupled to said hydraulic actuator.

6. The hitch and coupling arrangement, as defined in claim 1, wherein said first and second coupler sections respectively include first and second guide surface structures mounted for becoming engaged with one another as the first coupler section moves toward said second coupler section so as to effect a mating alignment between said first and second coupler sections.

7. The hitch and coupling arrangement, as defined in claim 6, wherein said first guide surface structure is a plate having a guide surface defined by a frusto-conical opening provided at a central location in said plate; and said second guide surface structure having a mating surface defined by an frusto-conical exterior surface.

8. The, hitch and coupling arrangement, as defined in claim 6, wherein one of said first and second guide surface structures is suspended by a spring biasing structure which yieldably retains said one of said first and second guide surface structures in a centered position.

9. The hitch and coupling arrangement, as defined in claim 7, wherein said first guide surface structure is a guide plate having a guide surface defined by a frusto-conical opening provided at a central location of said guide plate;
   a, biasing structure coupled between said first coupler section and said guide plate comprising an upright plate fixed to said first coupler section in parallel relationship to said guide plate; a plurality of guide rods extending parallel to a central axis of said frusto-conical opening and having first ends coupled to said guide plate; said upright plate having a plurality of holes respectively receiving said plurality of rods for sliding therein; a plurality of retaining nuts being respectively received on said plurality of rods for preventing the rods from being withdrawn from said holes in said upright plate; and a plurality of coil compression springs being respectively located on said plurality of rods and being located between said guide plate and said upright plate, whereby said guide plate may be deflected out of parallel relationship with said upright plate during engagement of said frusto-conical opening with said frusto-conical exterior surface.

10. In combination with a quick-coupler including a first coupler section defining a receptacle and a second coupler section defining an insert which is received in the receptacle when the coupler is connected together, a centering assembly for guiding said first and second coupler sections into axial alignment along a connection axis when the coupler sections are disconnected from each other and being moved together for connection, comprising: one of said first and second coupler sections being disposed such that an associated one of said receptacle or insert is centered along said coupling axis; said one of said first and second coupler sections including a centering member having an outwardly facing centering surface disposed in centered relationship to, and being tapered toward, said coupling axis in a direction toward another of said first and second coupler sections; said another of said first and second coupler sections including a second centering member having an inwardly facing centering surface shaped complimentary to said outwardly facing centering surface, with said second centering member being coupled in leading relationship to an associated receptacle or insert of said another of said first and second coupler sections, as considered with respect to said another of said first and second coupler sections moving toward said one of said first and second coupler sections, whereby contact between said outwardly and inwardly facing centering surfaces will result in said another of said first and second coupler sections being guided into axial alignment with said one of said first and second coupler sections.

11. The combination, as set forth in claim 10, wherein said outwardly facing centering surface includes a frusto-conical section, and wherein said second centering member includes a plate disposed substantially perpendicular to said connection axis and containing a frusto-conical opening defining said inwardly facing centering surface.

12. A method of coupling a mobile anhydrous ammonia applicator implement to a nurse tank wagon carrying a nurse tank, the implement being equipped with a rearwardly opening tongue receptacle and with a flexible supply hose having a first coupler section of a quick-coupler assembly at a rear end, and with the nurse tank wagon including a tongue having a forward end defined by a coupling element supported by a stand at a height for being connected to said tongue receptacle, and a flexible transfer hose extending from said nurse tank and having a second coupler section of a quick-coupler assembly at a front end supported above the tongue by a hose support structure, comprising the steps of:
   a) mounting said stand for movement to a stored position in response to said tongue receptacle receiving said coupling element;
   b) providing a remotely operable hitch pin for selectively securing said coupling element to said tongue receptacle;
   c) supporting said second quick-coupler section in an orientation for being coupled to said first quick-coupler section;
   d) backing said applicator implement toward said nurse tank and receiving said coupling element in said tongue receptacle while simultaneously contacting and moving said stand to said stored position;
   (e) remotely operating said hitch pin for securing said tongue receptacle and coupling element together;
   (f) mounting said first coupler section for fore-and-aft movement along said implement between a first position wherein the first coupler is separated from the second coupler section when the latter is in said orientation for being coupled to said first coupler section, and a second position wherein said first and second coupler sections are received one within another;
   (g) remotely moving said first quick-coupler section from said first to said second position once said tongue receptacle and coupling element are coupled together;
   (h) remotely locking said first and second quick-coupler sections together once step (g) has been completed; and
   (i) remotely returning said first quick-coupler section to said first position, with said second quick-coupler section remaining locked to said first quick-coupler section.

13. A method of applying anhydrous ammonia to a field, comprising:
   a) providing a mobile applicator implement having a hitch arrangement at its rear end defining a receptacle for receiving a coupling element of a nurse wagon tongue, said implement carrying a flexible supply hose having a first quick-coupler section at a forward end and mounted to a rear region of the implement for fore-and-aft movement;

b) providing at least first and second nurse tank wagons, each including a tongue having a coupling element at its forward end and a support stand pivotally mounted adjacent said coupling element for movement between a lowered support position supporting said tongue, and a raised stored position along said tongue;

c) providing first and second nurse tanks respectively on said first and second nurse tank wagons, with each nurse tank containing a supply of anhydrous ammonia and having a forwardly projecting, flexible transfer hose connected thereto, with each transfer hose having a forward end to which is coupled a second quick-coupler section, the second quick-coupler sections each being supported above said tongue for connection to said first quick-coupler section;

d) locating said second nurse tank at an exchange site located one of adjacent said field or at an end of said field;

e) backing said implement toward the supported tongue of said first nurse tank wagon such that said receptacle receives said coupling element of said tongue of said first nurse tank wagons;

f) while performing action (d), automatically causing said stand to be moved to said stored position;

g) remotely latching said coupling element to said hitch arrangement;

h) establishing a locked connection between said first and second quick-coupler sections including axially aligning said first quick-coupler with said second quick-coupler section and remotely effecting movement of said first quick-coupler section into engagement with said second quick-coupler section;

i) moving, said applicator implement to a region of a field where application of anhydrous ammonia is desired;

j) applying anhydrous ammonia to the field until the first nurse tank becomes depleted;

k) moving said applicator implement and nurse tank wagon to said exchange site;

l) remotely unlocking the first quick-coupler section from the second quick coupler section;

m) remotely disconnecting said hitch arrangement from said connector element;

n) moving said applicator implement away from said first nurse tank wagon while simultaneously moving said stand to said support position; and o) connecting said applicator implement to said second nurse tank wagon and nurse tank carried thereby by repeating steps (e), (f), (g) and (h).

14. In the method of applying anhydrous ammonia to a field, wherein an applicator implement towing a first nurse tank wagon carrying a first nurse tank containing anhydrous ammonia is caused to traverse the field, such implement including a flexible supply hose connected to a first flexible transfer hose, extending from the first nurse tank, by a quick-coupler assembly including first and second interlocked quick-coupler sections at respective ends of the supply and first transfer hoses, the improvement in such method including exchanging the first nurse tank, when emptied of anhydrous ammonia, for a second nurse tank containing anhydrous ammonia and located on a second nurse tank wagon parked at an exchange site, with the steps of exchanging including:

a) moving the applicator and towed first nurse tank wagon from a location of the field where the first nurse tank became emptied of anhydrous ammonia to said exchange site;

b) remotely disconnecting a towing connection between a hitch arrangement of said applicator implement and a coupling element at a forward end of a tongue of said first nurse tank wagon;

c) remotely effecting an unlocking of the interlocked first and second quick-coupler sections;

d) automatically separating the first and second quick-coupler sections from each other, with the first quick-coupler section remaining with the implement and the second quick-coupler section remaining with the first nurse tank wagon;

e) providing said second nurse tank wagon with a second tongue having a second connector element at its forward end;

f) providing said second tongue with a stand located in a lowered support position supporting said second tongue at a height disposing said second connector element for being received by said hitch arrangement; with said stand being mounted for vertical movement to a stored position on said tongue;

g) providing said second nurse tank with a forwardly projecting second flexible transfer hose having a third quick-coupler section, identical to said second quick-coupler section, at a forward end thereof supported above said tongue in a position for being connected to said first quick-coupler section;

h) moving the applicator implement away from the first nurse tank wagon and backing the applicator implement toward said second nurse tank wagon such that said connector element carried at the forward end of said second tongue is received by said hitch arrangement;

i) remotely connecting said coupler element of said second tongue to said hitch arrangement while simultaneously moving said stand from said supporting position to said stored position;

j) remotely moving said first quick-coupler section toward said third quick-coupler section so as to dispose one within the other;

k) remotely establishing an interlocked condition of said first and third quick-coupler sections; and l) moving said applicator implement together with said third nurse tank wagon to the location in said filed where the first nurse tank became emptied and there resuming application.

15. The method of applying anhydrous ammonia, as defined in claim 14, wherein step (d) includes supporting said first quick-coupler section so that it is angled downwardly toward said second quick-coupler section, whereby gravity automatically effects separation of said first and second quick-coupler sections, one from the other, once step (c) has occurred.

16. The method of applying anhydrous ammonia, as defined in claim 15, and further including the step of automatically supporting said second quick-coupler section in a disposition for re-connection to said first quick-coupler section.

17. The method of applying anhydrous ammonia, as defined in claim 16, wherein said step of automatically supporting said second quick-coupler section includes providing an upwardly and forwardly inclined hose cradle having a front end region of said first transfer hose received for sliding fore-and-aft therein.

18. The method of applying anhydrous ammonia, as defined in claim 14, wherein said step (f) includes the step of contacting said stand with said hitch arrangement for moving said stand to said stored position as said hitch arrangement of said applicator implement is being backed so as to receive said connector element at the front end of said second tongue.

19. The method of applying anhydrous ammonia, as defined in claim 14, wherein step (b) is followed by the step of providing said tongue with a parking stand mounted for automatically moving from a raised stored position on the tongue to a lowered support position when said applicator implement is moved away from said first nurse tank wagon.

20. The method of applying anhydrous ammonia, as defined in claim 19, wherein said step of providing the tongue with a parking stand includes mounting the parking stand such that it is supported in its stored position by said hitch arrangement of the applicator implement when the coupling element is received by the hitch arrangement , but automatically gravitates from its stored position to its support position when the hitch arrangement is separated from the coupling element.

21. The method of applying anhydrous ammonia, as defined in claim 14, and further including the step of interlocking the first and second quick-coupler sections so as to resist them becoming disconnected from each other during normal operation but permitting them to separate in the event that the hitch arrangement should become accidentally separated from the nurse tank wagon being towed.

22. The method of applying anhydrous ammonia, as defined in claim 14, wherein steps (k) and (l) are performed concurrently.

* * * * *